(12) United States Patent
Jung (10) Patent No.: US 6,621,646 B2
(45) Date of Patent: Sep. 16, 2003

(54) ADJUSTABLE TABLE MAGNIFIER

(76) Inventor: Ki-Su Jung, 661-6 Shinha-ri, Youngkwang-eup, Youngkwang-gun, Chollanam-do (KR)

( * ) Notice: Subject to any disclaimer, the term of this patent is extended or adjusted under 35 U.S.C. 154(b) by 0 days.

(21) Appl. No.: 10/000,436

(22) Filed: Oct. 24, 2001

(65) Prior Publication Data

US 2002/0051304 A1 May 2, 2002

(30) Foreign Application Priority Data

| Oct. 26, 2000 | (KR) | ................................ 2000-63303 |
| Mar. 27, 2001 | (KR) | ................................ 2001-8398 |
| Mar. 27, 2001 | (KR) | ................................ 2001-8412 |

(51) Int. Cl.[7] .............................. G02B 27/02; G02B 7/02
(52) U.S. Cl. ....................................... 359/802; 359/822
(58) Field of Search ................................. 359/801, 802, 359/803, 804, 805, 806, 807, 808, 809, 822

(56) References Cited

U.S. PATENT DOCUMENTS

| 4,685,647 A | * | 8/1987 | Calhoun .................. 248/444.1 |
| 5,239,416 A | * | 8/1993 | Spitzberg .................... 359/802 |
| 6,322,226 B1 | * | 11/2001 | Dickson ....................... 362/33 |
| 6,417,894 B1 | * | 7/2002 | Goff et al. .................. 348/832 |

FOREIGN PATENT DOCUMENTS

| JP | 11221121 | 8/1999 | ........... A47B/23/06 |

* cited by examiner

Primary Examiner—Ricky Mack
(74) Attorney, Agent, or Firm—Webb Ziesenheim Logsdon Orkin & Hanson P.C.

(57) ABSTRACT

An adjustable table magnifier, designed to allow users to commonly use it after focusing in accordance with their visual powers, is disclosed. This adjustable table magnifier, has a base unit, an adjustable arm unit mounted to the base unit at its lower end and having a telescopic structure to be adjustable in its length, and a lens unit mounted to the upper end of the adjustable arm unit, and used for magnifying an object. In the table magnifier, the focus length of the lens unit is adjustable by controlling the length of the arm unit.

24 Claims, 11 Drawing Sheets

ADJUSTABLE TABLE MAGNIFIER

BACKGROUND OF THE INVENTION

1. Field of the Invention

The present invention relates, in general, to table magnifiers used on support surfaces, such as tables, and, more particularly, to an adjustable table magnifier for public use designed to allow users to commonly use it after focusing in accordance with their visual powers.

2. Description of the Prior Art

In some countries, reading glasses for public use are provided on a table in a public institution, such as a bank, a library or the civil service consultation center of an administrative agency, for elderly visitors having impaired vision. Typically, such a public institution provides several pairs of reading glasses, classified by the standard visual powers of visitors in their forties, fifties, sixties, and seventies, on a table and allows the visitors to put on appropriate glasses while writing or reading a document on the table.

However, such reading glasses for public use provided in public institutions are problematic in that they are inconvenient to users since they force a user putting on the glasses to take them off prior to choosing the appropriate pair of reading glasses prior to use. In addition, the reading glasses for public use may pass on a contagious eye disease of a user to other users, thus having a hygienic problem and deterring the visitors from using the glasses. Another problem of such reading glasses is that it is necessary for the public institution to provide several pairs of reading glasses classified by the standard visual powers of elderly visitors, thus causing a problem in the management of the fragile glasses.

When a user wearing these glasses writes or reads a document on a table in a public institution, their eyes must be positioned on the table such that the eyes and lenses of glasses are almost vertically positioned on a target area of the document laid on the table. This forces the user standing around the table to lower their head almost at a right angle. When such a head posture is maintained for a lengthy period of time, the eyes and neck of the user are easily fatigued and stressed. Sometimes, the stressed posture of the lowered head may cause a dislocation of the cervical vertebra in case of an elderly person having a weak cervical vertebra.

SUMMARY OF THE INVENTION

Accordingly, the present invention has been made keeping in mind the above problems occurring in the prior art, and an object of the present invention is to provide an adjustable table magnifier, which is commonly usable by users having different visual powers and is easily adjustable in the height of its lens.

Another object of the present invention is to provide an adjustable table magnifier, which allows a user putting on the glasses to use the magnifier without taking the glasses off.

A further object of the present invention is to provide an adjustable table magnifier, which allows a user to only slightly lower the head while writing or reading a document, thus allowing the user to maintain good posture of the head while being not fatigued or stressed at the cervical vertebra.

Still another object of the present invention is to provide an adjustable table magnifier, which allows an office manager to conveniently manage the magnifier, and which may be firmly installed on a table when necessary, thus being less likely to be broken.

In order to accomplish the above objects, an embodiment of the present invention provides an adjustable table magnifier, comprising a base unit, an adjustable arm unit mounted to the base unit at its lower end and having a telescopic structure to be adjustable in its length, and a lens unit mounted to an upper end of the adjustable arm unit and used for magnifying an object, whereby a focus length of the lens unit is adjustable by controlling the length of the arm unit.

In the table magnifier, the adjustable arm unit comprises a sleeve, an extension tube axially and movably inserted into the sleeve, and a length adjusting unit provided on the extension tube for selectively holding the extension tube to a desired position of the sleeve, whereby the length of the arm unit is adjustable by controlling the projected length of the extension tube from the sleeve using the length adjusting unit.

The length adjusting unit comprises an adjusting ball, and a compression coil spring set in the extension tube so as to normally bias the adjusting ball outward in a radial direction of the extension tube, whereby the adjusting ball is removably seated in one of a plurality of adjusting holes formed along a sidewall of the sleeve.

The above adjustable table magnifier is preferably provided with an adjusting knob, which is removably threaded into the sidewall of the sleeve at a predetermined position so as to hold the extension tube at an adjusted position relative to the sleeve when the knob is tightened.

In accordance with another embodiment of this invention, the adjustable table magnifier comprises a base unit, an adjustable arm unit mounted to the base unit at its lower end and being adjustable in its length, and consisting of a support column mounted to the base unit and having an externally-threaded projection at its upper end, a length adjusting unit axially and rotatably assembled with the externally-threaded projection of the support column and having an externally-threaded bar at its upper end, and an extension column axially and rotatably assembled with the externally-threaded bar of the length adjusting unit, and a lens unit mounted to an upper end of the extension column of the adjustable arm unit, and used for magnifying an object, whereby the extension column of the adjustable arm unit is axially extended or retracted relative to the length adjusting unit by a rotating action of the length adjusting unit, thus adjusting the length of the adjustable arm unit.

The above adjustable table magnifier preferably further comprises a cylindrical guide axially and concentrically mounted to the upper end of the length adjusting unit such that the cylindrical guide surrounds the externally-threaded bar and receives the extension column therein, at least one guide rail axially formed along the internal surface of the cylindrical guide or on the external surface of the extension column, and at least one guide channel axially formed along a remaining one of the two surfaces of the cylindrical guide and the extension column and movably engaged with the guide rail, whereby an axial movement of the extension column in response to a rotating action of the length adjusting unit is stably guided without being tilted.

In the adjustable table magnifier according to the embodiments of this invention, the lens unit comprises a magnifying lens, a lens holder for holding the magnifying lens, and a hinge for rotatably connecting the lens holder to the upper end of the adjustable arm unit.

The lens unit preferably has a fluorescent lamp mounted to at least one edge of the lens holder.

In such a case, a ballast is preferably installed in the base unit, and is connected to the fluorescent lamp through an electric wire extending through the adjustable arm unit.

In accordance with a further embodiment, the base unit has a sufficient area suitable for stably supporting a book or a document thereon, and is inclined at a predetermined angle at its top support wall.

In the above embodiment, the angle of inclination of the top support wall of the base unit is preferably set to 5°~30°.

In accordance with another embodiment of this invention, an adjustable table magnifier comprises a base unit having a sufficient area suitable for stably supporting a book or a document thereon; an adjustable arm unit mounted to said base unit at its lower end and being adjustable in its length; and a lens unit mounted to an upper end of said adjustable arm unit, and used for magnifying an object, whereby said base unit is inclined at an angle of 5°~30°, and a focus length of the lens unit is adjusted by controlling the length of the adjustable arm unit.

In the above embodiment the lens unit preferably comprises a magnifying lens; a lens holder for holding said magnifying lens; a hinge for rotatably connecting said lens holder to the upper end of said adjustable arm unit; a fluorescent lamp mounted to at least one edge of said lens holder; and a ballast installed in said base unit and connected to the fluorescent lamp.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference now should be made to the drawings, in which the same reference numerals are used throughout the different drawings to designate the same or similar components.

Figure 1:
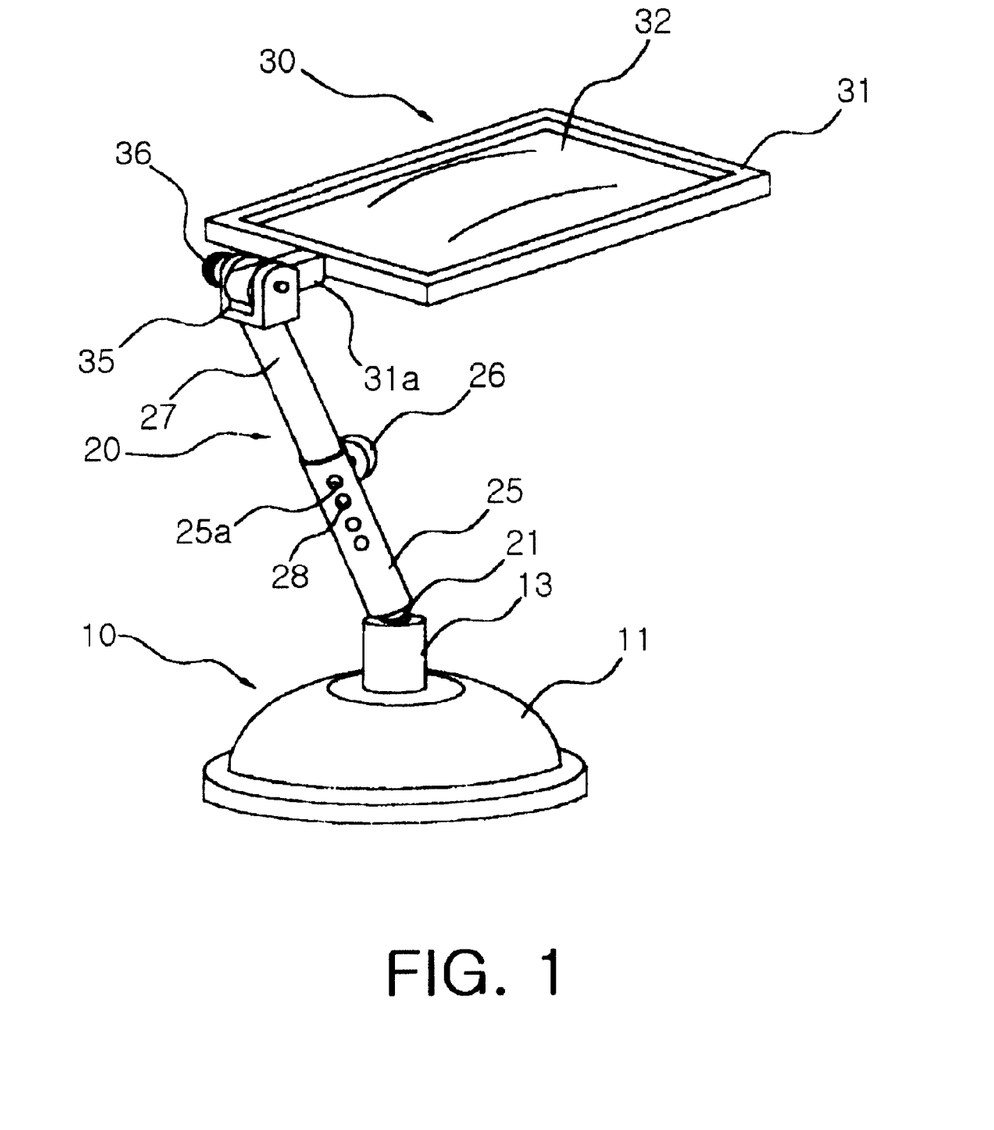
FIG. 1 is a perspective view of an adjustable table magnifier in accordance with the primary embodiment of the present invention.

FIG. 1 is a perspective view of an adjustable table magnifier in accordance with the primary embodiment of the present invention. As shown in the drawing, the table magnifier according to the primary embodiment comprises a base unit 10, an adjustable arm unit 20, and a lens unit 30.

The base unit 10 allows the magnifier to stand on a table without another support means. This base unit 10 has an appropriate weight, which stably supports the weighted lens unit 30 suspended in air by the adjustable arm unit 20. The base unit 10 consists of a base 11 with a joint.

In the present invention, the base 11 may have a variety of shapes and may be made of a variety of materials without affecting the function of this invention. That is, the base 11 may have a regular hexahedral shape, a rectangular hexahedral shape, a polygonal cone shape, a hemispherical shape, or an elliptic shape. In addition, the base 11 may be made of plastic, iron or stainless steel.

The lower surface of the base 11 is preferably designed to have a large area capable of stably supporting the weighted lens unit 30 suspended in air at a height above a support surface. In addition, a double-sided adhesive tape or a vacuum pad may be provided on the lower surface of the base 11 for more stably holding the magnifier on a support surface, such as the top wall of a table, due to an adhesive force or an absorption force. When using a double-sided adhesive tape or a vacuum pad on the lower surface of the base 11, it is possible to prevent the magnifier from being unexpectedly dropped from a table onto the floor by a careless user.

The adjustable arm unit 20 is movably connected to the top of the base 11 using a universal joint or a ball joint capable of allowing the arm unit 20 to be rotatable relative to the vertical axis of the base 11 at a desired angle. In the primary embodiment of FIG. 1, a ball joint is used for connecting the arm unit 20 to the base 11. That is, a ball seat member 13 is set on the top of the base 11, while a ball 21 is provided on the lower end of the arm unit 20. The ball 21 is set within the ball seat member 13, and so the rotatable connection of the arm unit 20 to the base 11 is accomplished.

In order to assemble the ball seat member 13 with the base 11, the seat member 13 is threaded on its external surface, and is screwed into an internally-threaded hole formed at the top center of the base 11. The ball seat member 13 is thus mounted to the base 11.

The adjustable arm unit 20 connects the weighted lens unit 30 to the base unit 10. This arm unit 20 has a telescopic tubular structure consisting of a sleeve 25 and an extension tube 27, thus allowing a user to freely focus by adjusting the focus length of the lens unit 30. That is, the extension tube 27 is axially inserted into the sleeve 25, thus allowing a user to adjust the length of the arm unit 20 as desired within a range allowed by the length of the sleeve 25.

The ball 21 is provided at the lower end of the sleeve 25, and is assembled with the ball seat member 13 of the base 11, thus forming a desired ball joint. A hinge yoke 35 for rotatably connecting the lens unit 30 to the arm unit 20 is provided at the upper end of the extension tube 27 and the lens unit 30. This hinge yoke 35 is jointed to a hinge arm 31a of the lens unit 30, thus forming a hinge joint allowing the lens unit 30 to be rotatable relative to the arm unit 20 as will be described in detail later herein.

The arm unit 20, consisting of the sleeve 25 and the extension tube 27, supports the lens unit 30 at a desired height above a support surface. This arm unit 20 is thus appropriately shaped and made of an appropriate material so as to have a strength capable of preventing the arm unit 20 from being bent or deformed by the weighted lens unit 30. It is preferred to make the lens unit 20 using stainless steel.

Figure 2:
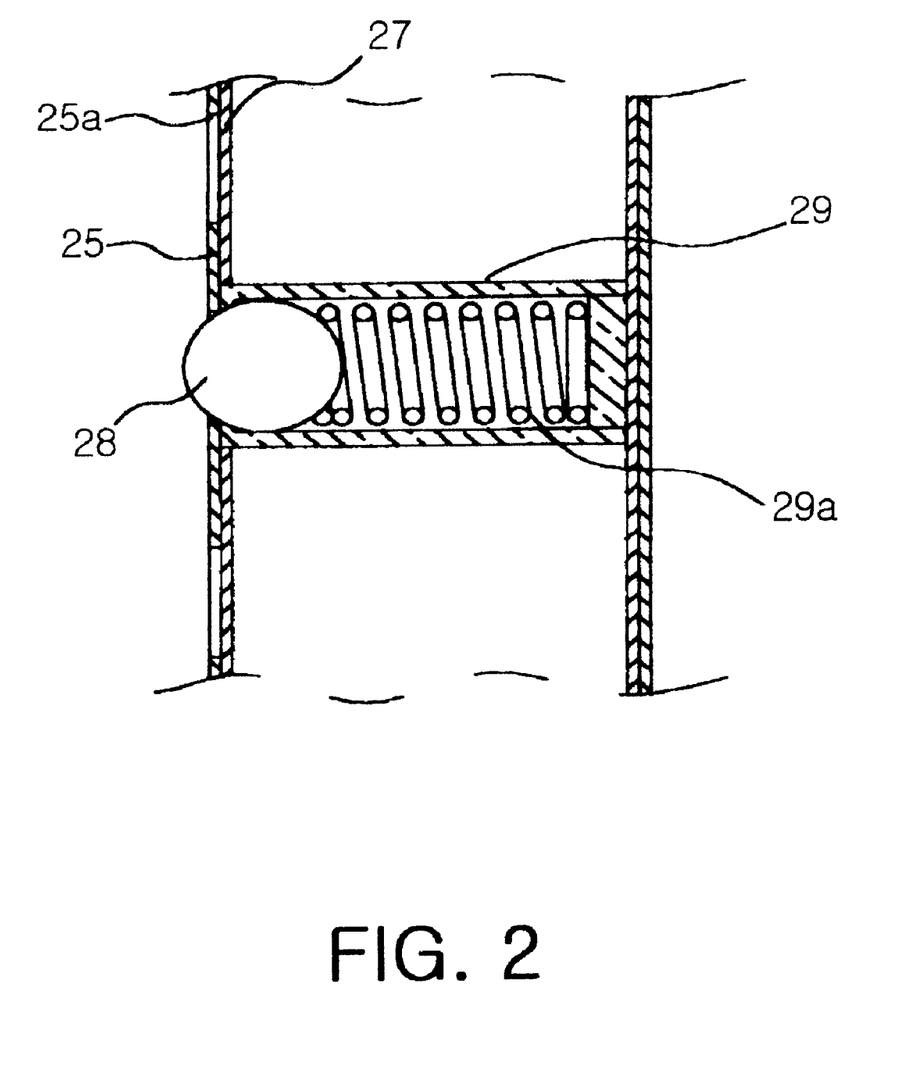
FIG. 2 is a sectional view of a length adjusting unit included in the table magnifier of FIG. 1.

FIG. 2 is a sectional view of a length adjusting unit included in the table magnifier of FIG. 1. This length adjusting unit allows a user to adjust the length of the arm unit 20 and focus the lens unit as desired. The length adjusting unit of the primary embodiment is constructed as follows.

As shown in FIG. 2, a plurality of adjusting holes 25a are regularly formed along the sidewall of the sleeve 25, while a ball seat hole 29 is transversely formed on a desired position of the extension tube 27. An adjusting ball 28 is seated in the ball seat hole 29 while being normally biased outward by a compression coil spring 29a. The adjusting ball 28 is thus elastically projected from or retracted into the ball seat hole 29 in the radial direction of the sleeve 25. When the adjusting ball 28 is aligned with an adjusting hole 25a of the sleeve 25, a part of the ball 28 is elastically projected from the hole 25a, thus maintaining the adjusted length of the extension tube 27 relative to the sleeve 25. Therefore, it is possible for a user to adjust the length of the extension tube 27 relative to the sleeve 25 by seating the adjusting ball 28 in a desired adjusting hole 25a. In such a case, the user pushes the ball 28 into the ball seat hole 29 by the finger tip or a sharpened material.

It is preferred to provide an adjusting knob 26 on the upper portion of the sleeve 25 for holding the extension tube 27 at an adjusted position relative to the sleeve 25. This adjusting knob 26 is movably threaded into the sidewall of the sleeve 25 at a position opposite to an adjusting hole 25a. An adjusted position of the extension tube 27 relative to the sleeve 25 is thus more stably maintained by the adjusting knob 26 in addition to the engagement of the adjusting ball 28 with an adjusting hole 25a.

The lens unit 30 comprises a magnifying lens 32, a lens holder 31, and a hinge arm 31a. The lens holder 31 holds the magnifying lens 32, while the hinge arm 31a connects the lens holder 31 to the arm unit 20.

The shape and dimension of the magnifying lens 32 may be freely designed in accordance with purposes of magnifiers. When the purpose of the magnifier of this invention is for public use, the lens 32 will preferably have a rectangular shape with a width of 20~30 cm and a length of 7~10 cm.

Figure 11:
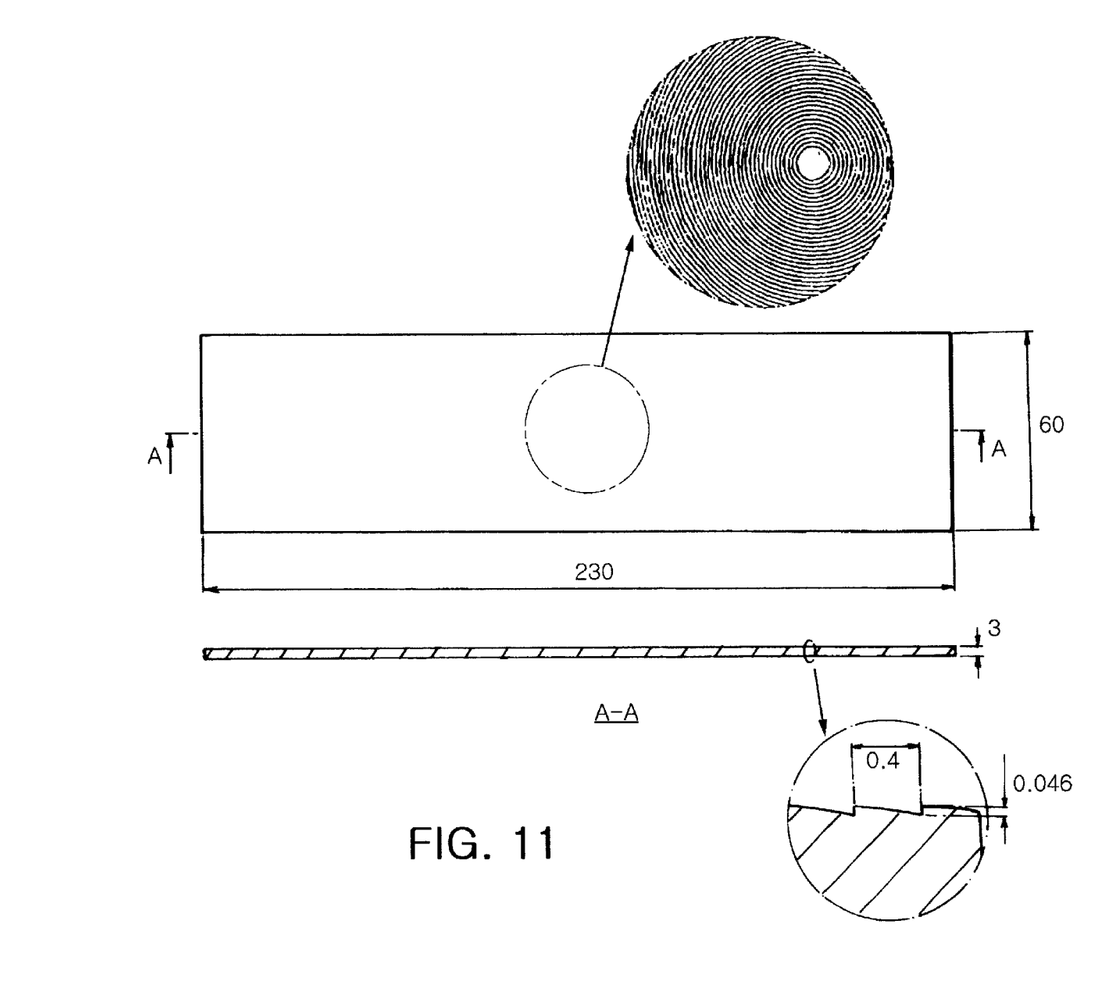
FIG. 11 is a view showing the shape and dimension of a magnifying lens preferably used in the table magnifier of the present invention.

A sheet lens having a rectangular shape of FIG. 11 may be usable as the magnifying lens 32 of the lens unit 30 of this invention. The lens of FIG. 11 has a function of magnifying an object in the same manner as that expected from a conventional convex lens. However, this sheet lens is specifically designed such that its central portion is not thicker than the peripheral portion, which is different from conventional convex lenses. When the magnifying lens used in the magnifier of this invention is not thickened at its central portion as described above, it is possible to produce the lenses 32 for magnifiers in commercial quantity through an injection molding process, in addition to reducing the volume and weight of the lenses 32.

In the preferred embodiments of the present invention, the above-mentioned object is accomplished by the use of a sheet lens with a concentric circle pattern. As shown in FIG. 11, the concentric circles engraved on the surface of the sheet lens have a height of 0.046 mm and a pitch of 0.4 mm. The sheet lens of this invention also has a thickness of 4 mm, and is made of plastic.

The lens holder 31 stably holds the lens 32, and has the hinge arm 31a at its side edge. This hinge arm 31a is jointed to the hinge yoke 35 of the arm unit 20 using a knobbed hinge pin 36 to form a hinge joint which allows a user to adjust the angle of the lens unit 30 relative to the arm unit 20 as desired within an angular range.

The adjustable table magnifier of this invention will be used as follows: That is, when it is desired to magnify an object, such as a document, using the magnifier, a user lays the document at a desired position on a support surface, such as the top wall of a table, and moves the lens unit 30 to a desired position above the document by rotating the arm unit 20 relative to the base unit 30. In such a case, the ball 21 of the sleeve 25 is rotated in the ball seat member 13 of the base unit 10 at an angle, thus allowing the lens unit 30 to be easily positioned above the document. After positioning the lens unit 30 above the document laid on the table, the user views the contents of the document through the lens 32 to confirm whether the document is in or out of focus. When the contents of the document is blurry because the document is out of the focus, the height of the lens unit 30 from the document is appropriately adjusted by controlling the length of the extension tube 27 relative to the sleeve 25. In such a case, the adjusting knob 26 is loosened prior to changing the position of the adjusting ball 28 relative to the adjusting holes 25a. After the adjusting ball 28 is inserted into a selected hole 25a, the adjusting knob 26 is tightened to fix the extension tube 27 to the sleeve 25 at the adjusted position. The focus length of the lens 32 may be further adjusted by rotating the lens unit 30 around the hinge joint relative to the hinge yoke 35 of the arm unit 20 until the document is in focus.

The adjustable table magnifier according to the primary embodiment of this invention is commonly usable by users of different visual powers, in addition to allowing a user putting on the glasses to use the magnifier without taking the glasses off.

Figure 3:
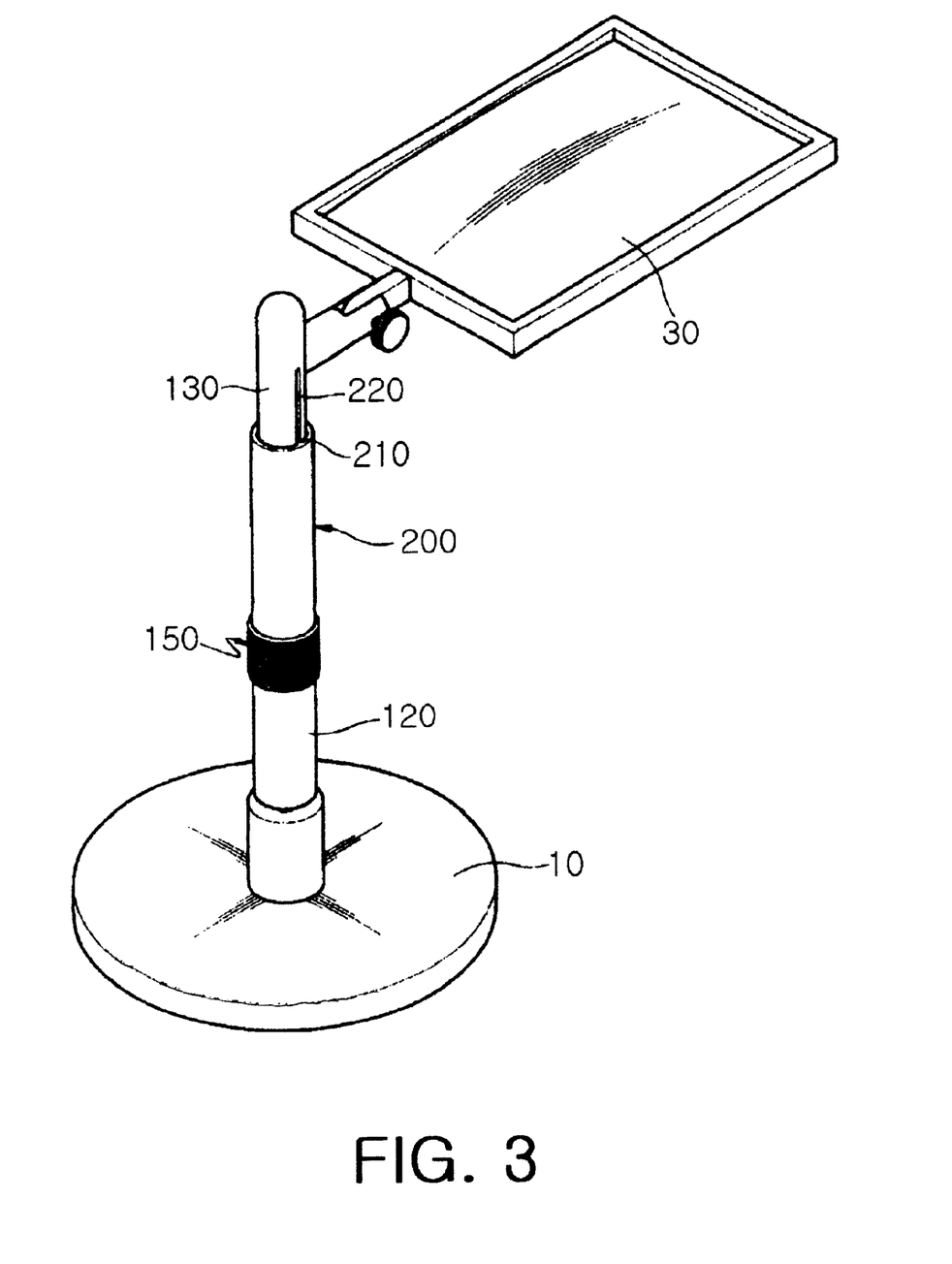
FIG. 3 is a perspective view of an adjustable table magnifier in accordance with the second embodiment of the present invention.
Figure 4:
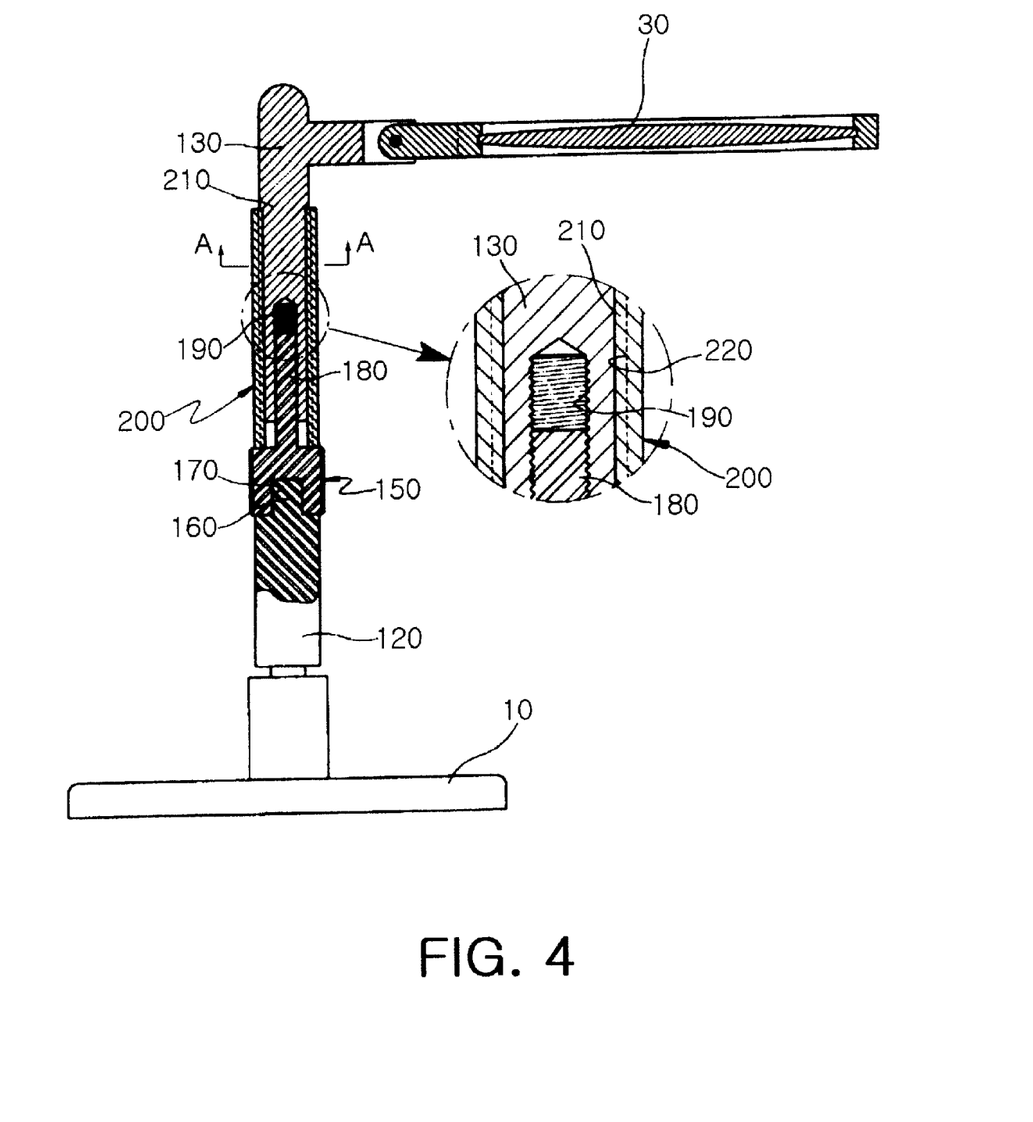
FIG. 4 is a side sectional view of the table magnifier of FIG. 3.

FIGS. 3 and 4 show an adjustable table magnifier in accordance with the second embodiment of the present invention. As shown in the drawings, the table magnifier according to the second embodiment comprises a base unit 10 supporting the magnifier on a support surface, an adjustable arm unit vertically mounted to the top of the base unit 10, and a lens unit 30 hinged to the upper end of the arm unit. In the magnifier of this embodiment, the adjustable arm unit is designed such that its length is adjustable as desired within a predetermined range so as to adjust the height of the lens unit 30 above a support surface. In order to accomplish the above object, the adjustable arm unit has a length adjusting unit 150.

The adjustable arm unit consists of a support column 120, which is vertically mounted to the top of the base unit 10 and has an externally-threaded projection 160 axially extending upward from its upper end. The length adjusting unit 150 is axially and rotatably assembled with the projection 160 of the support column 120. An externally-threaded bar 180 integrally extends upward from the top center of the length adjusting unit 150. An extension column 130 having an internally-threaded axial hole at its lower portion is axially assembled with the length adjusting unit 150 by movable engagement of its internally-threaded axial hole with the externally-threaded bar 180 of the unit 150. The lens unit 30 is hinged to the upper end of the extension column 130 by a hinge joint.

In FIG. 4, the internally-threaded axial hole, formed at the lower portion of the extension column 130 and movably engaging with the externally-threaded bar 180 of the length adjusting unit 150, is designated by reference numeral 190.

In the second embodiment, it is preferred to make the external surface of the body of the length adjusting unit 150 uneven through the knurling process, as an example. Such an uneven external surface of the unit 150 allows a user to stably manipulate the unit 150 without slippage when rotating the unit 150 with their fingers.

When the length adjusting unit 50 is rotated in the same direction as the tightening direction of the externally-threaded bar 180 of the length adjusting unit 150 relative to the internally-threaded hole 190 of the extension column 130, the extension column 130 is moved downward to reduce the height of the lens unit 30 above a support surface. When the length adjusting unit 50 is rotated in a loosening direction, the extension column 130 is moved upward to increase the height of the lens unit 30.

Therefore, it is apparent that the operational function of the length adjusting unit 150 of this second embodiment is equal to that of the length adjusting unit of the primary embodiment.

In order to stably guide an axial movement of the extension column 130 relative to the length adjusting unit 150 of the second embodiment, a cylindrical guide 200 is axially and concentrically mounted to the upper end of the unit 150 and axially receives the extension column 130 therein.

Figure 5:
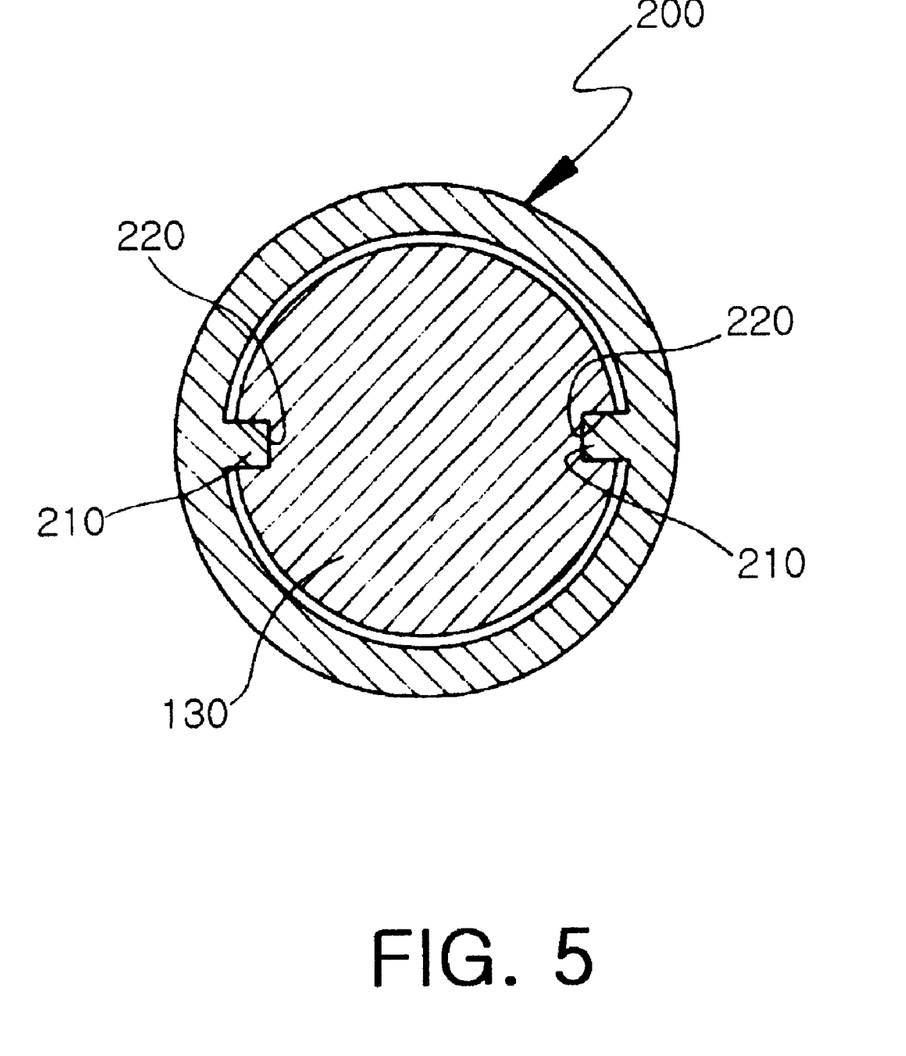
FIG. 5 is a sectional view of the table magnifier according to the second embodiment taken along the line A—A of FIG. 4.

In such a case, it is necessary to hold the extension column 130 inside the cylindrical guide 200 so as to prevent the column 130 from being rotated or tilted relative to the guide 200 during an axial movement of the column 130. In order to accomplish the above object, two guide rails 210 are axially formed along the internal surface of the cylindrical guide 200 at diametrically opposite positions, while two guide channels 220 are axially formed along the external surface of the extension column 130 at diametrically opposite positions and movably engage with the two guide rails 210. Since the two guide rails 210 of the cylindrical guide 200 movably engage with the two guide channels 220 of the extension column 130 as described above, the extension column 130 is stably moved upward or downward inside the cylindrical guide 200 without being rotated or tilted relative to the guide 200 during a length adjusting process.

Of course, it should be understood that two guide channels may be axially formed along the internal surface of the cylindrical guide 200 at diametrically opposite positions, while two guide rails may be axially formed along the external surface of the extension column 130 so as to movably engage with the two guide channels of the cylindrical guide 200.

In addition, the support column 120 of the adjustable arm unit mounted to the base unit 10 may be divided into upper and lower pieces, which are coupled to each other by a ball joint capable of allowing the upper piece of the column 120 to be rotatable relative to the vertical axis of the lower piece within a predetermined angular range as expected from the primary embodiment. Since the lens unit 30 is hinged to the upper end of the extension column 130 through a hinge joint, it is possible to adjust the angle of the lens unit 30 relative to the extension column 130 as desired.

In the second embodiment, the construction of the base unit 10 and the lens unit 30 may remain the same as that described for the primary embodiment of FIG. 1. However, it should be understood that the construction of the base unit 10 and/or the lens unit 30 may be altered from that of the primary embodiment.

For example, the construction of the base unit of the table magnifier according to this invention may be altered from that of the primary or second embodiment of FIG. 1 or 3, as shown in FIGS. 6 to 9 showing adjustable table magnifiers in accordance with the third embodiment of the present invention.

As shown in FIGS. 6 to 9, the adjustable table magnifier according to the third embodiment of this invention has a lens unit 30, a support column 120, an extension column 130, and a length adjusting unit 150. The support column 120 is fixedly mounted to the top of a base unit 300 at its lower end.

In the third embodiment of FIGS. 6 to 9, the general construction of the table magnifier remains the same as that described for the second embodiment of FIG. 3, but the construction of the base unit is altered as follows.

Figure 6:
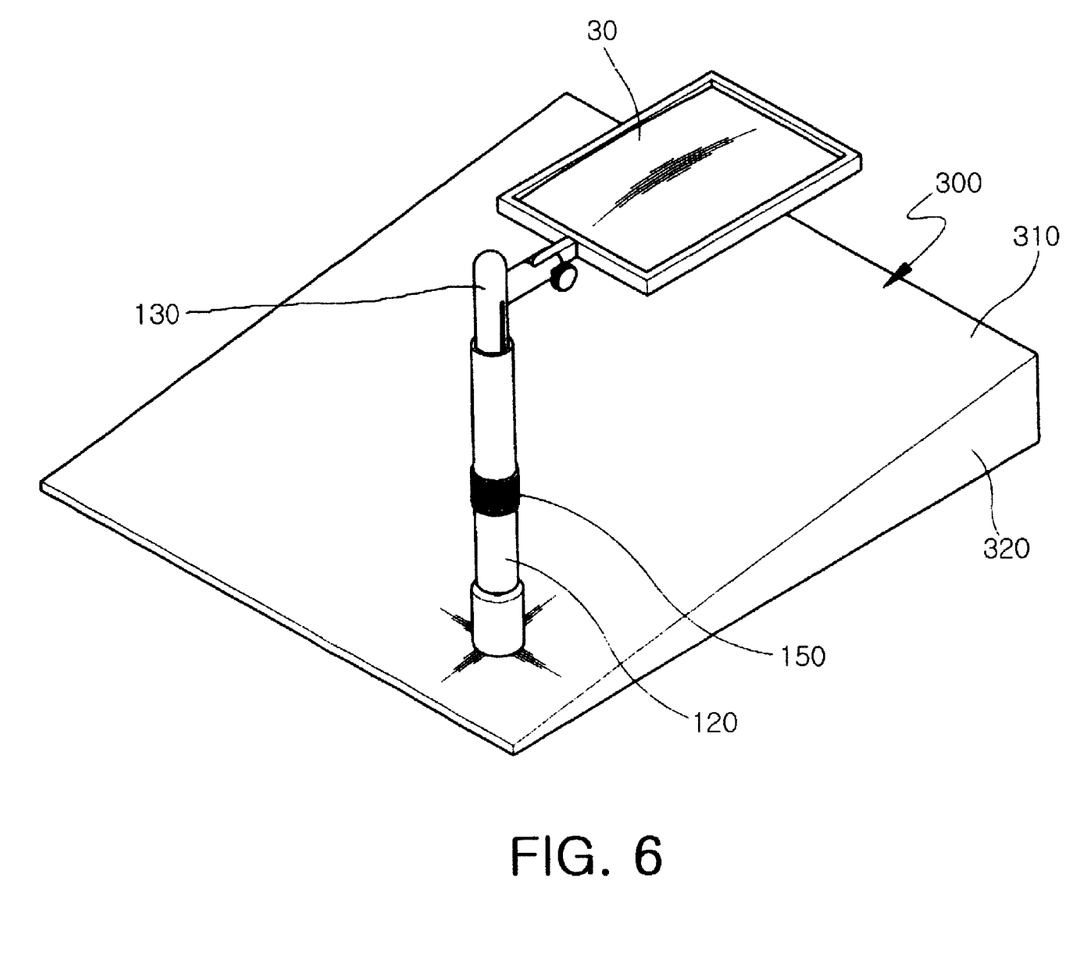
FIG. 6 is a perspective view of an adjustable table magnifier in accordance with the third embodiment of the present invention.
Figure 7:
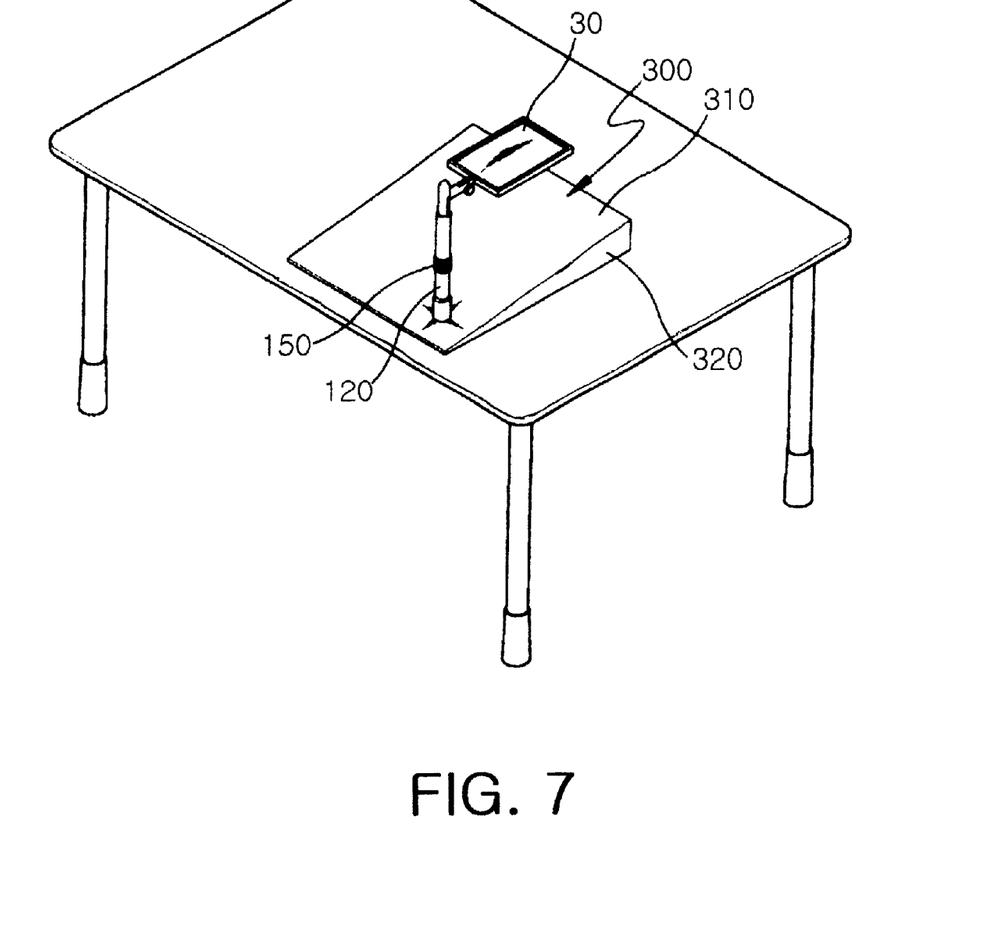
FIG. 7 is a perspective view of the table magnifier of FIG. 6 when laid on a table.
Figure 8:
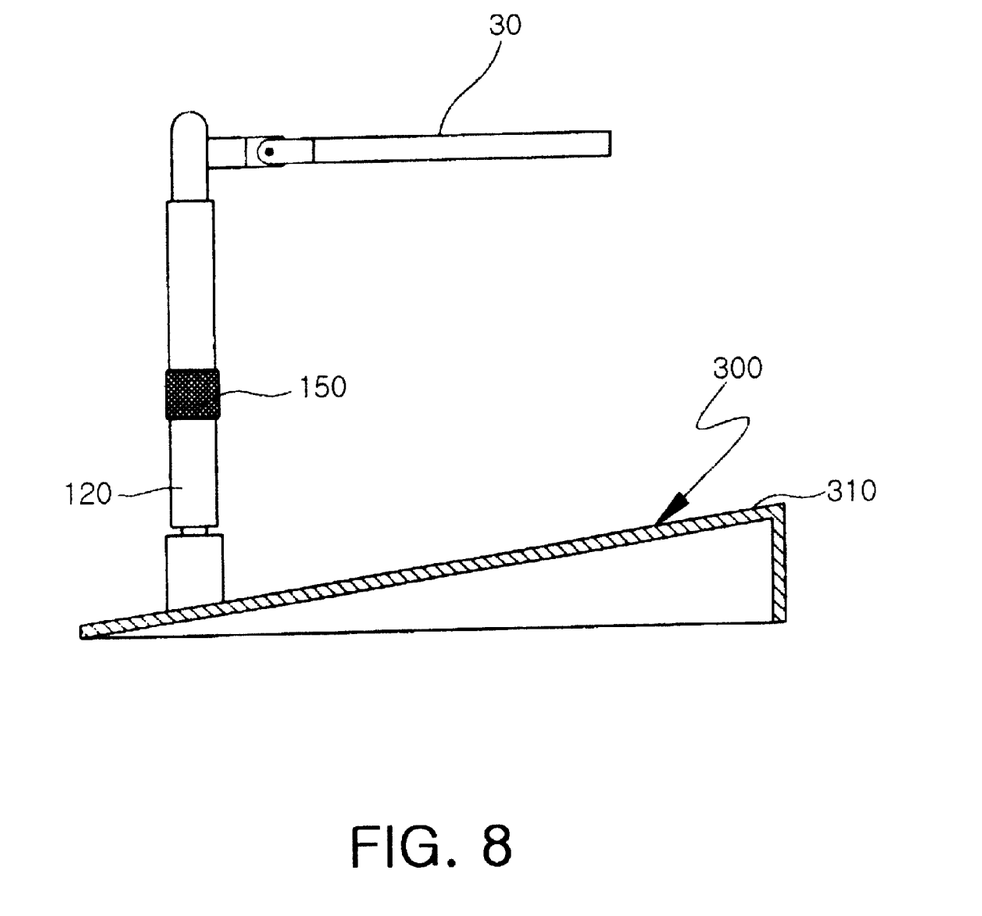
FIG. 8 is a side sectional view of the table magnifier of FIG. 6.

In the third embodiment, the base unit 300 laid on a support surface consists of an inclined top support wall 310, which has a rectangular profile and supports a document or a book thereon. The three open sides of the base unit 300 under the inclined top support wall 310 are closed by three sidewalls 320, and so the bottom of the base unit 300 is horizontal. In the present invention, the angle of inclination of the top support wall 310 is preferably set to 5°~30°. When the inclination angle of the top support wall 310 is less than 5°, the base unit 300 forces users to excessively lower their heads. When the inclination angle of the top support wall 310 is more than 30°, the base unit 300 is inconvenient for a user while reading or writing a document laid on the top support wall 310.

In addition, the base unit 300 may be provided with a conventional means for allowing a user to adjust the angle of the top support wall 310 relative to a horizontal support surface as desired. For example, one or more adjustable bolts may be vertically mounted to the top support wall 310 at a position around the rear edge of the wall 310. In such a case, the sidewalls 320 may be removed from the base unit 300. The adjustable bolts allow a user to adjust the angle of inclination of the top support wall 310 relative to a horizontal support surface as desired by rotating the bolts in either direction. Alternatively, an adjustable bolt with a ball at its outside end may be horizontally mounted to the central portion of the top support wall 310. In such a case, the sidewalls 320 may be removed from the base unit 300. A user is allowed to adjust the angle of inclination of the top support wall 310 relative to a horizontal support surface as desired by rotating the adjustable bolt.

When the table magnifier is provided with such a base unit 300, a user conveniently writes or reads a document or a book laid on the inclined top support wall 310 while viewing the document or the book with the head slightly lowered at an angle of 5°~30°. Therefore, the table magnifier with such a base unit 300 prevents the eyes and neck of a user from being fatigued or stressed, and prevents the elderly persons from having a dislocation of the cervical vertebra.

In the present invention, a length adjusting unit is provided in the adjustable arm unit for allowing a user to adjust the length of the arm unit and adjust the height of the lens unit above a document laid on a support surface. In the primary embodiment, the length adjusting unit comprises a spring-biased ball of the extension tube and a plurality of adjusting holes formed on the sidewall of the sleeve. In the second embodiment, the length adjusting unit comprises a body having both an externally-threaded bar and a cylindrical guide. The lens unit 30 is hinged to the upper end of the adjustable arm unit by a hinge joint, and so it is possible to appropriately magnify any desired area of a document or a book laid on a support surface.

Figure 9:
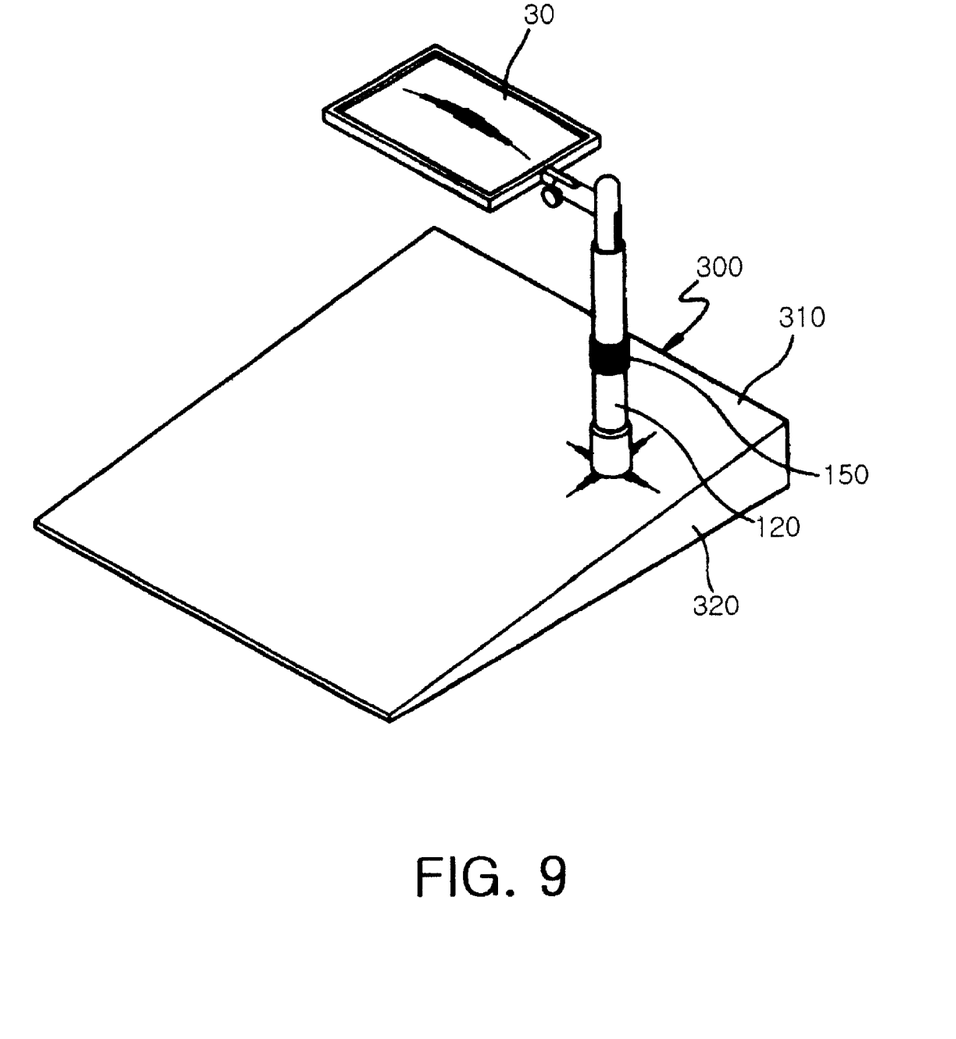
FIG. 9 is a perspective view of a modification of the table magnifier of FIG. 6.

In the third embodiment of FIGS. 6, 7 and 8, the adjustable arm unit is mounted on a corner of the lower portion of the inclined top support wall 310. However, the adjustable arm unit may be mounted on the middle portion of the inclined top support wall 310, or on a corner of the higher portion of the wall 310 as shown in FIG. 9 showing a modification of the third embodiment. In case of a table magnifier for right-handed persons, the adjustable arm unit is preferably mounted on the left side of the top support wall. In case of a table magnifier for left-handed persons, the adjustable arm unit is preferably mounted on the right side of the top support wall.

Figure 10:
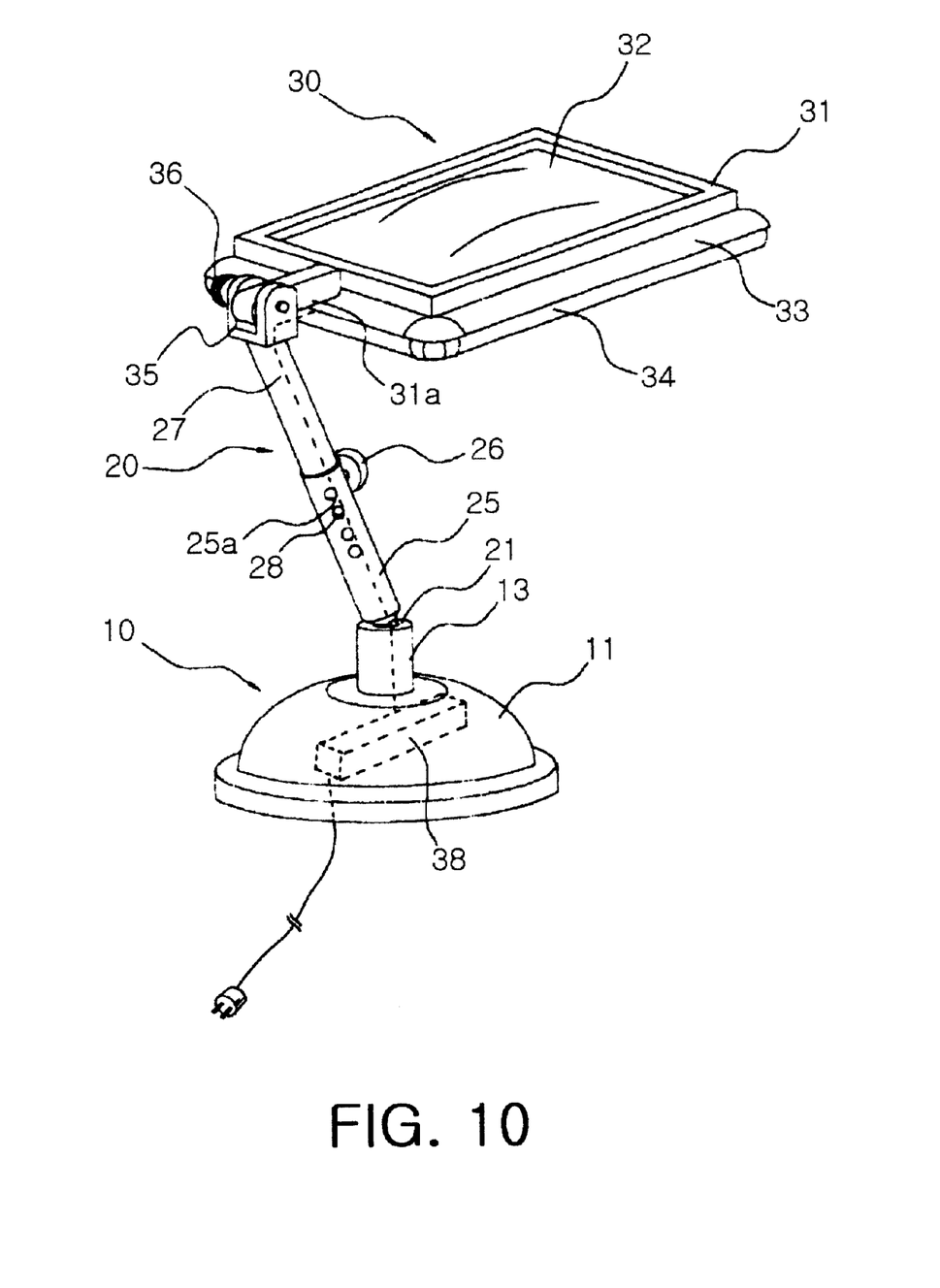
FIG. 10 is a perspective view of an adjustable table magnifier in accordance with the fourth embodiment of the present invention.

FIG. 10 is a perspective view of an adjustable table magnifier in accordance with the fourth embodiment of the present invention. As shown in the drawing, a lamp may be mounted to at least one edge of the lens unit 30. In the fourth embodiment, the general shape of the magnifier except for the provision of the lamp on the lens unit remains the same as that described in the primary embodiment. However, it should be understood that the lamp may be mounted to the lens unit of the magnifier according to the second or third embodiment of this invention.

In the fourth embodiment, at least one lamp 34, for example, a fluorescent lamp, is mounted to the lens unit 30 of the magnifier. That is, the lamp 34 is mounted to the lens holder 31 of the lens unit 30 such that the lamp 34 is directed toward the base unit 10. The lamp 34 is covered with a shade 33, and so the light from the lamp 34 is directed toward the base unit without being scattered to blind the eyes of a user.

When a fluorescent lamp is installed on the lens unit 30 as described above, it is necessary to install a ballast 38 for lamps in the base unit 10. In such a case, the fluorescent lamp 34 is connected to the ballast 38 through an electric wire extending through the adjustable arm unit, and a switch (not shown) is installed at a desired position of the base unit 10.

When the table magnifier is provided with a lamp 34, it is possible to effectively use the magnifier in a dark area. Furthermore, the magnifier provided with such a lamp 34 may be preferably used as a table lamp.

As described above, the present invention provides an adjustable table magnifier, which is commonly used by users having different visual powers and allows a user putting on the glasses to use the magnifier without taking them off.

The adjustable table magnifier of this invention, which is commonly usable by users having different visual powers, allows its manager to conveniently manage the magnifier. This table magnifier may be firmly installed on a table when necessary, thus being less likely to be broken.

The adjustable table magnifier for public use of this invention provided in public institutions does not promote contagious eye diseases of users to other users, and so it does not have a hygienic problem and allows visitors of the public institutions to use the magnifier without fear.

When the adjustable table magnifier of this invention is used in offices or home, it improves business efficiency in offices and allows elderly persons having impaired vision to easily read or write a book or a document in the home.

In addition, it is possible for a user to easily and simply adjust the height of the lens of this magnifier from a support surface and adjust the focus length of the lens as desired by operating a length adjusting unit provided in the adjustable arm unit.

The base unit of this table magnifier may be provided with an inclined top support wall for allowing a user to lay a book or a document on the inclined top support wall while reading or writing a document, thus allowing the user to have a good posture of the head while being not fatigued or stressed at the cervical vertebra.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An adjustable table magnifier, comprising:
   a base unit;
   an adjustable arm unit mounted to the base unit at its lower end, the adjustment arm unit comprising:
   a sleeve;
   an extension tube axially and movably inserted into said sleeve; and
   a length adjusting unit provided on said extension tube for selectively holding said extension tube to a desired position of said sleeve,
   wherein the length of the arm unit is adjustable by controlling a projected length of the extension tube from the sleeve using the length adjusting unit; and
   a lens unit mounted to an upper end of the adjustable arm unit, and used for magnifying an object,
   wherein a focus length of said lens unit is adjustable by controlling the length of the arm unit.

2. The adjustable table magnifier according to claim 1, wherein said lens unit comprises:
   a magnifying lens;
   a lens holder for holding said magnifying lens; and
   a hinge for rotatably connecting said lens holder to the upper end of said adjustable arm unit.

3. The adjustable table magnifier according to claim 1, wherein said length adjustment unit comprises:
   an adjusting ball; and
   a compression coil spring set in said extension tube so as to normally bias the adjusting ball outward in a radial direction of the extension tube,
   wherein said adjusting ball is removably seated in one of a plurality of adjusting holes formed along a sidewall of said sleeve.

4. The adjustable table magnifier according to claim 3, wherein an adjusting knob is removably threaded into the sidewall of the sleeve at a predetermined position so as to hold the extension tube at an adjusted position relative to the sleeve when the knob is tightened.

5. The adjustable table magnifier according to claim 3, wherein said lens unit comprises:
   a magnifying lens;
   a lens holder for holding said magnifying lens; and
   a hinge for rotatably connecting said lens holder to the upper end of said adjustable arm unit.

6. The adjustable table magnifier according to claim 1, wherein said lens unit comprises:
   a magnifying lens;
   a lens holder for holding said magnifying lens; and
   a hinge for rotatably connecting said lens holder to the upper end of said adjustable arm unit.

7. The adjustable table magnifier according to claim 6, wherein said lens unit further comprises a fluorescent lamp mounted to at least one edge of the lens holder.

8. The adjustable table magnifier according to claim 6, wherein said base unit has a sufficient area suitable for stably supporting a book or a document thereon, and is inclined at a predetermined angle at its top support wall, and said lens unit is pivotally adjustable with respect to said base unit.

9. The adjustable table magnifier according to claim 8, wherein the angle of inclination of the top support wall of said base unit is 5°~30°.

10. The adjustable table magnifier according to claim 7, wherein said base unit has a sufficient area suitable for stably supporting a book or a document thereon, and is inclined at a predetermined angle at its top support wall, and said lens unit is pivotally adjustable with respect to said base unit.

11. The adjustable table magnifier according to claim 10, wherein the angle of inclination of the top support wall of said base unit is 5°~30°.

12. The adjustable table magnifier according to claim 7, further comprising a ballast installed in said base unit and connected to the fluorescent lamp through an electric wire extending through the adjustable arm unit.

13. An adjustable table magnifier, comprising:

a base unit;

an adjustable arm unit mounted to said base unit at its lower end and being adjustable in its length, said arm unit consisting of:
 a support column mounted to said base unit and having an externally-threaded projection at its upper end;
 a length adjusting unit axially and rotatably assembled with the externally-threaded projection of said support column, and having an externally-threaded bar at its upper end; and
 an extension column axially and rotatably assembled with the externally-threaded bar of said length adjusting unit; and a lens unit mounted to an upper end of said extension column of the adjustable arm unit, and used for magnifying an object, whereby said extension column of the adjustable arm unit is axially extended or retracted relative to the length adjusting unit by a rotating action of the length adjusting unit, thus adjusting the length of the adjustable arm unit.

14. The adjustable table magnifier according to claim 13, further comprising:

a cylindrical guide axially and concentrically mounted to an upper end of said length adjusting unit such that the cylindrical guide surrounds said externally-threaded bar, said cylindrical guide receiving the extension column therein;

at least one guide rail axially formed along an internal surface of said cylindrical guide or on an external surface of said extension column; and at least one guide channel axially formed along a remaining one of said two surfaces of the cylindrical guide and the extension column, and movably engaged with said guide rail, whereby an axial movement of the extension column in response to a rotating action of the length adjusting unit is stably guided without being tilted.

15. The adjustable table magnifier according to claim 14, wherein said lens unit comprises:

a magnifying lens;

a lens holder for holding said magnifying lens; and a hinge for rotatably connecting said lens holder to the upper end of said extension column.

16. The adjustable table magnifier according to claim 13, wherein said lens unit comprises:

a magnifying lens;

a lens holder for holding said magnifying lens; and a hinge for rotatably connecting said lens holder to the upper end of said extension column.

17. The adjustable table magnifier according to claim 16, wherein said base unit has a sufficient area suitable for stably supporting a book or a document thereon, and is inclined at a predetermined angle at its top support wall.

18. The adjustable table magnifier according to claim 17, wherein the angle of inclination of the top support wall of said base unit is 5°~30°.

19. The adjustable table magnifier according to claim 16, wherein said lens unit further comprises a fluorescent lamp mounted to at least one edge of the lens holder.

20. The adjustable table magnifier according to claim 19, further comprising a ballast installed in said base unit and connected to the fluorescent lamp through an electric wire extending through the adjustable arm unit.

21. The adjustable table magnifier according to claim 19, wherein said base unit has a sufficient area suitable for stably supporting a book or a document thereon, and is inclined at a predetermined angle at its top support wall.

22. The adjustable table magnifier according to claim 21, wherein the angle of inclination of the top support wall of said base unit is 5°~30°.

23. An adjustable table magnifier, comprising:

a base unit having a sufficient area suitable for stably supporting a book or document thereon;

an adjustable arm unit mounted to said base unit at its lower end and being adjustable in its length; and a lens unit mounted to an upper end of said adjustable arm unit, and used for magnifying an object, wherein said base unit is inclined at an angle of 5°~30°, a focus length of the lens unit is adjusted by controlling the length of the adjustable arm unit, and said lens unit is pivotally adjustable with respect to said base unit.

24. The adjustable table magnifier according to claim 23, wherein said lens unit comprises:

a magnifying lens;

a lens holder for holding said magnifying lens;

a hinge for rotatably connecting said lens holder to the upper end of said adjustable arm unit;

a fluorescent lamp mounted to at least one edge of said lens holder; and a ballast installed in said base unit and connected to the fluorescent lamp.

* * * * *

UNITED STATES PATENT AND TRADEMARK OFFICE
CERTIFICATE OF CORRECTION

PATENT NO. : 6,621,646 B2
DATED : September 16, 2003
INVENTOR(S) : Ki-Su Jung It is certified that error appears in the above-identified patent and that said Letters Patent is hereby corrected as shown below:

<u>Column 7,</u>
Line 3, "50" should read -- 150 --.
Line 9, "50" should read -- 150 --.

Signed and Sealed this

Ninth Day of March, 2004

JON W. DUDAS
*Acting Director of the United States Patent and Trademark Office*